United States Patent
Perlin

(10) Patent No.: US 6,867,776 B2
(45) Date of Patent: Mar. 15, 2005

(54) STANDARD FOR PERLIN NOISE

(76) Inventor: Kenneth Perlin, 7-13 Washington Sq. North, Apt. 31B, New York, NY (US) 10003

( * ) Notice: Subject to any disclaimer, the term of this patent is extended or adjusted under 35 U.S.C. 154(b) by 0 days.

(21) Appl. No.: 10/042,647

(22) Filed: Jan. 8, 2002

(65) Prior Publication Data

US 2002/0135590 A1 Sep. 26, 2002

Related U.S. Application Data

(60) Provisional application No. 60/260,751, filed on Jan. 10, 2001.

(51) Int. Cl.[7] .............................................. G06T 17/00
(52) U.S. Cl. ...................... 345/428; 345/581; 345/582; 345/643
(58) Field of Search ......................................... 345/643

(56) References Cited

U.S. PATENT DOCUMENTS 6,088,036 A * 7/2000 Morris ........................ 345/428

OTHER PUBLICATIONS

"An Image Synthesizer." Perlin, Ken. Proceedings of the 12th annual conference on Computer graphics and interactive techniques. ACM Press, 1985. pp. 287–296.*

* cited by examiner

*Primary Examiner*—Matthew C. Bella
*Assistant Examiner*—Antonio Caschera
(74) *Attorney, Agent, or Firm*—Ansel M. Schwartz

(57) ABSTRACT

An apparatus for generating an image. The apparatus includes a computer. The apparatus includes a display connected to the computer upon which images from the computer appear. The apparatus includes a mechanism for producing images with texture that do not have visible grid artifacts. The producing mechanism disposed in the computer. A method for generating images. The method includes the steps of producing the images with texture that do not have visible grid artifacts with the computer. There is the step of displaying the images on a display.

6 Claims, 2 Drawing Sheets

STANDARD FOR PERLIN NOISE

This is a non-provisional application of U.S. provisional application Ser. No. 60/260,751 filed Jan. 10, 2001.

FIELD OF THE INVENTION

The present invention is related to an improved standard for noise. More specifically, the present invention is related to noise where images have texture but do not have visible grid artifacts and/or are visually isotropic.

BACKGROUND OF THE INVENTION

Perlin Noise has been a mainstay of computer graphics since 1985, being the core procedure that enables procedural shaders to produce natural appearing materials. Now that real-time graphics hardware has reached the point where memory bandwidth is more of a bottleneck than is raw processing power, it is imperative that the lessons learned from procedural shading be adapted properly to real-time hardware platforms.

There are two major issues involved in this adaptation: (i) A common procedural shading abstract machine language, to enable the capabilities that were first introduced in [Perlin, K., *An Image Synthesizer*, Computer Graphics; Vol. 19 No. 3, incorporated by reference herein], and subsequently adapted by the motion picture special effects industry, and (ii) a standard, fast, robust, differentiable and extensible Noise function contained in the instruction set of this abstract machine language. This disclosure addresses the second of these two issues.

The ideal of Perlin Noise can be separated from the shortcomings of any particular implementation which aims to approximate this ideal. [Perlin, K., *An Image Synthesizer*, Computer Graphics; Vol. 19 No. 3, incorporated by reference herein] outlined a number of characteristics for an ideal Perlin Noise. Ideally, a hardware-implemented standard would conform to this ideal, without suffering from any shortcomings.

The traditional Perlin Noise algorithm, while very useful, had some shortcomings that would be of particular consequence in a real-time setting and in a hardware implementation. This disclosure describes a new method that suffers from none of these shortcomings. Shortcomings which are addressed in this disclosure include:

Lack of a single standard reference implementation: Unlike the situation to date with software Noise, all implementations should ideally produce the same result for the same input, up to the inherent limitation imposed by limited bit depth, on all platforms and implementations.

Requiring many multiplies: The original formulation of Noise required, as a subset of its component calculations, that a gradient be evaluated at each corner of a cube surrounding the input point. Each gradient evaluation requires an inner product, which costs three multiplies, at each of eight cube vertices, for a total of 24 multiplies. A multiply is expensive in its use of hardware, relative to such other operations as bit manipulation and addition. In a hardware implementation, it would be greatly advantageous to redefine Noise so that it does not require this large number of multiplies.

Visually significant anisotropy: The Noise function is ideally a directionally insensitive (isotropic) signal. However, the original implementation, because it consists of adjoining 3D tricubic patches, contains visible directional artifacts which are an unavoidable consequence of its underlying algorithm. This is also the case for approximations that mimic that implementation, such as nVidia's recent Noise patch [Technical Demos—Perlin Noise http://www.nvidia.com/Support/ Developer Relations/Technical Demos, Disclosed Nov. 10, 2000, incorporated by reference herein].

Specifically, when these implementations of Perlin Noise are applied to a rotated domain, a casual viewer of the result can easily pick out the orientation of the rotated coordinate grid. Ideally, it should be impossible for a casual viewer to infer the orientation of the rotated coordinate system, when presented with the texture image produced by Perlin Noise applied to a rotated domain.

Gradient artifacts: The original Noise function uses a piecewise cubic blending function $3t^2-2t^3$ in each dimension. When the Noise function uses this blending function, then visually noticeable discontinuities appear in the derivative of the Noise function along the 3D tricubic patch boundaries of the Noise function's domain, since the derivative of the derivative of this blending function contains a piecewise constant term.

Difficulty of computing a derivative: The original Noise algorithm contains an associated derivative function which is difficult to compute algorithmically, since it consists of a product of a linear function with three cubic splines. In non-real time applications, the Noise derivative has generally been approximated by evaluating differences of Noise at closely spaced sample points along the three coordinate axes. This has required evaluating the Noise function four times. In a hardware implementation such an approach would not only consume valuable gates, but would be impractical for any method that used less than full floating point precision, since the use of difference methods to computer derivative requires high bit depth. It is desirable for a hardware Noise standard to possess an associated derivative function that can be computable analytically, at a cost of a relatively modest number of gates. This is particularly important when using Noise to compute normal perturbations and other effects that use the derivative of Noise, as opposed to its value.

Need for table memory: The original Noise algorithm relied on a number of table lookups, which are quite reasonable in a software implementation, but which in a hardware implementation are expensive and constitute a cost bottleneck, particularly when multiple instances of the Noise function are required in parallel. Ideally, a Noise implementation should not rely on the presence of tables of significant size.

Memory-limited extent of the volume tile: Perlin Noise is generally defined within a repeating volumetric tile. In previous implementations, the extent of this tile has been limited by table size. Ideally, Noise should be based on a virtual volume which is scalable, inexpensively, to any extent.

Expense of generalizing to higher dimensions: The original implementation of Noise was based on a cubic lattice. Moving to higher dimensions causes implementation cost to more than double with each additional dimension, since it requires moving to an n-dimensional hypercube lattice. In hardware, this cost would be measured as a product of gate count and number of successive instruction cycles. For example, the cost of Noise over four dimensions is at least twice the cost of Noise over three dimensions. Quite soon, it will be desirable to extend the standard from 3D Noise to 4D Noise (to account for time-varying volume textures), and thereafter to 5D Noise (to specify textured BRDFs). It is important to address this issue now.

Lack of separation between signal and reconstruction: The original Noise presented the pseudo-random gradient field (its "signal") and its tricubic interpolation scheme (its "reconstruction filter") as a single functional object. It would be greatly advantageous for a method to allow these two operations to be cleanly separable, so that other signals which share the same hardware and abstract machine language can also use this reconstruction filter.

In non-real time applications, in which perfection of the final result is far more important than is processing budget, such as is the case in the use of Noise for motion picture special effects, it is possible to "fudge" some these artifacts by applying Noise multiple times. For example, the procedural shaders for the scene depicting ocean waves in the recent film "The Perfect Storm" combined about 200 shader procedures, each of which invoked Perlin Noise. In contrast, for real-time applications, where the cost of every evaluation counts, it is crucial that Noise itself be artifact free, that its derivative be directly computable, and that it incur a relatively small computational cost.

SUMMARY OF THE INVENTION

The present invention pertains to an apparatus for generating an image. The apparatus comprises a computer. The apparatus comprises a display connected to the computer upon which images from the computer appear. The apparatus comprises a mechanism for producing images with texture that do not have visible grid artifacts, the producing mechanism disposed in the computer.

The present invention pertains to a method for generating images. The method comprises the steps of producing the images with texture that do not have visible grid artifacts with the computer. There is the step of displaying the images on a display. Preferably, there is the step of introducing information into the computer from which the images are produced.

BRIEF DESCRIPTION OF THE DRAWINGS

In the accompanying drawings, the preferred embodiment of the invention and preferred methods of practicing the invention are illustrated in which.

DETAILED DESCRIPTION

Figure 1:
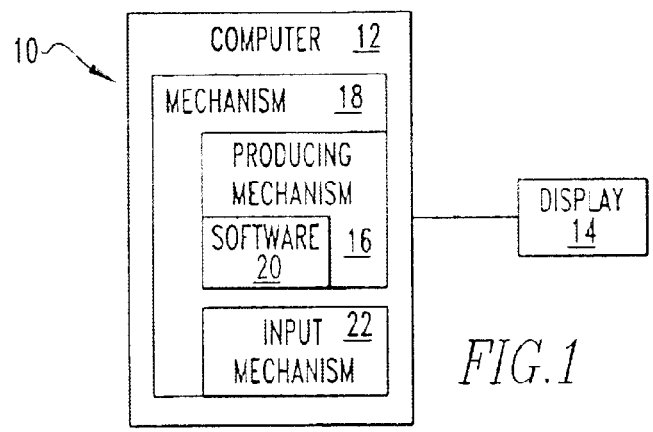
FIG. 1 is a schematic representation of the apparatus of the present invention.

Referring now to the drawings wherein like reference numerals refer to similar or identical parts throughout the several views, and more specifically to FIG. 1 thereof, there is shown an apparatus 10 for generating an image. The apparatus 10 comprises a computer 12. The apparatus 10 comprises a display 14 connected to the computer 12 upon which images from the computer 12 appear. The apparatus 10 comprises a mechanism 16 for producing images with texture that do not have visible grid artifacts, the producing mechanism 16 disposed in the computer 12.

Preferably, the computer 12 has a memory 18, and the producing mechanism 16 includes software 20 disposed in the memory 18 for producing images with texture that do not have visible artifacts. Preferably, the computer 12 also has an input mechanism 22, such as a keyboard or modem or DVD drive, to name but a few of many possible input mechanism 22 in which information can be introduced into the computer 12.

The present invention pertains to a method for generating images. The method comprises the steps of producing the images with texture that do not have visible grid artifacts with the computer 12. There is the step of displaying the images on a display 14. Preferably, there is the step of introducing information into the computer 12 from which the images are produced.

In the operation of the invention, the technique of implementing Noise described herein conforms to the ideal Noise specification of [Perlin, K., *An Image Synthesizer*, Computer Graphics; Vol. 19 No. 3, incorporated by reference herein] more closely. While providing the same general "look" as previous versions of Noise, it also:

provides a single uniform standard result on any platform, is visually isotropic, unlike the original algorithm, does not require significant table space to compute good pseudo-random gradients, can have an arbitrarily large extent for its repeating virtual tile, at very low cost, does not require multiplies to evaluate gradient at surrounding grid vertices, does not produce visible grid artifacts, does not produce visible artifacts in the derivative, is cheaper to compute than is the original algorithm, allows for a direct analytic computation of derivative at reasonable cost, can be generalized to higher dimensions at relatively small computational expense.

The method is described in two parts:

A pseudo-random signal generator primitive, and

A reconstruction primitive.

This separation enables other signal generators that reside on the same graphics hardware chip to share the same reconstruction hardware and API.

Figure 2:
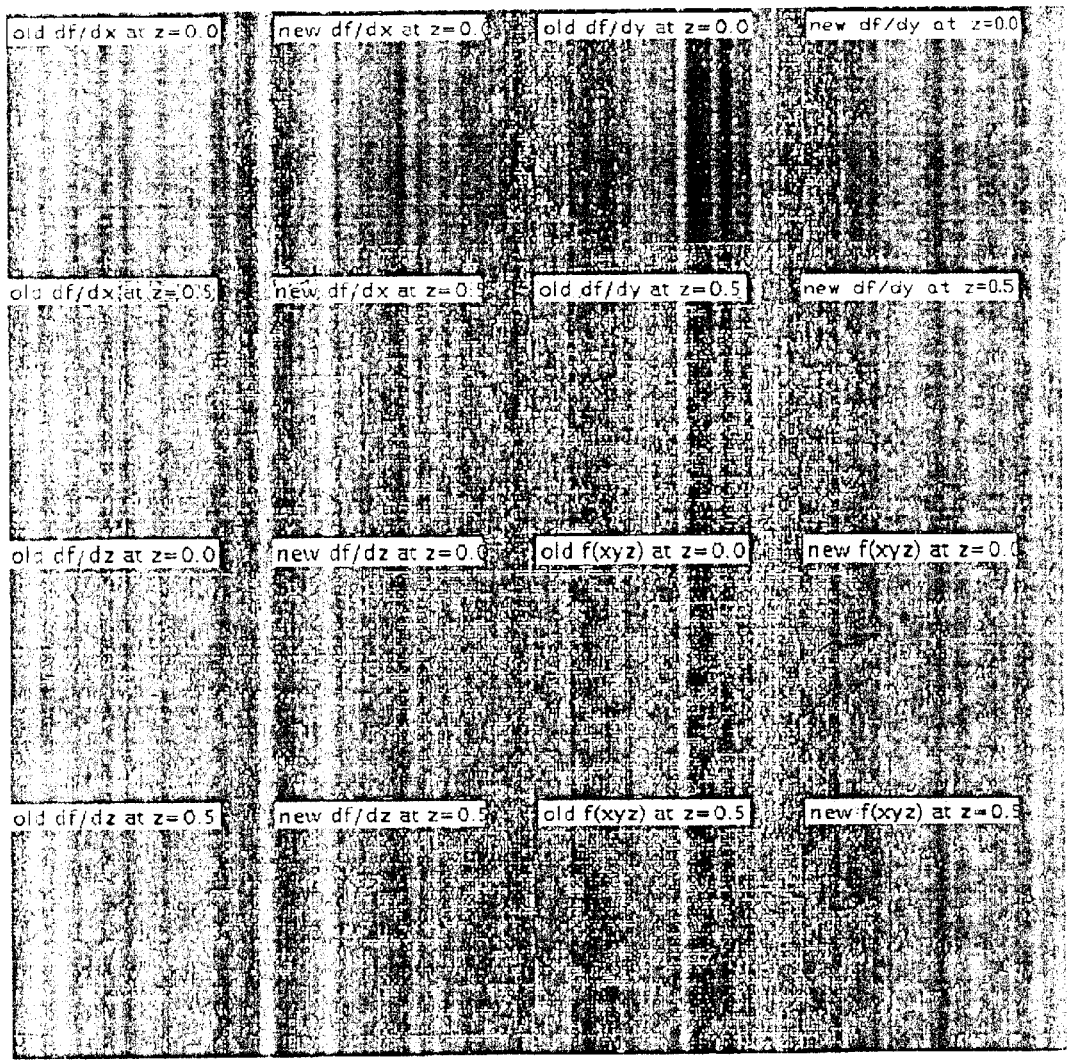
FIG. 2 is a side-by-side visual comparison of "traditional" Perlin Noise with the method described here.

FIG. 2 is a side-by-side visual comparison of "traditional" Perlin Noise with the method described here. The four quadrants of FIG. 2 represent, respectively:

| df/dx = d(Noise(xyz))/dx | df/dy = d(Noise(xyz))/dy |
| df/dz = d(Noise(xyz))/dz | f(xyz) = Noise(xyz) |

Each of these quadrants is divided into four sub-quadrants. These represent, respectively:

| old Noise at z = 0 | new Noise at z = 0 |
| old Noise at z = 0.5 | new Noise at z = 0.5 |

The old and new Noise look roughly the same when evaluated at z=0, the major visual difference being that the new Noise implementation is visually isotropic. Specifically, if the picture is arbitrarily rotated, it is not possible for an observer examining any subportion of the resulting texture to infer, by visual examination, the original orientation of the image produced by new Noise, whereas it is possible for an observer to infer this orientation for the image produced by the old Noise.

Note also the appearance of the derivative with respect to z. In the old Noise this degenerates into an image of fuzzy squares.

Figure 3:
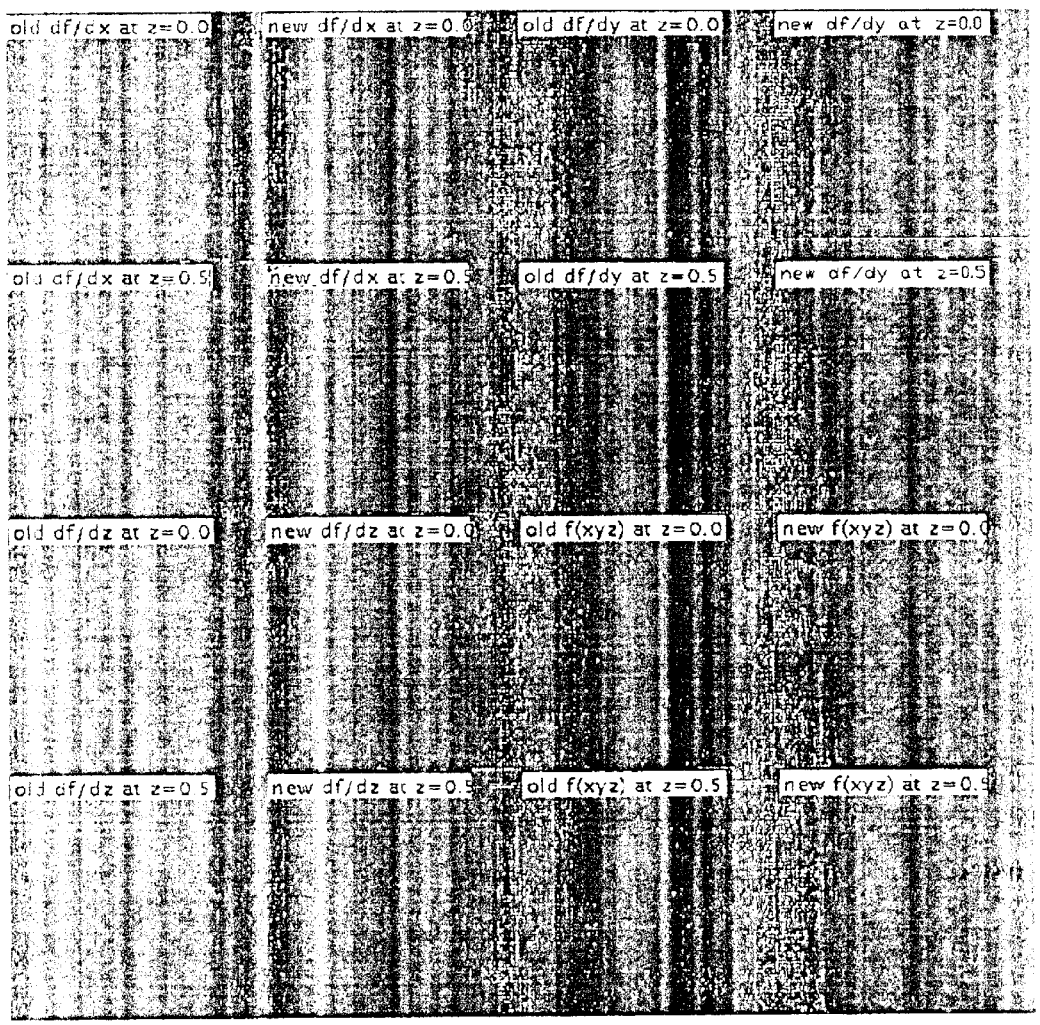
FIG. 3 is the same comparison, this time with the domain magnified by a factor of four.

FIG. 3 is the same comparison, this time with the domain magnified by a factor of four. Note the artifacts in df/dx and in df/dy in old Noise, which appear as thin vertical streaks in df/dx and as thin horizontal streaks in df/dy. This is due to the use of the piecewise cubic interpolant function $3t^2-2t^3$, whose derivative is $6t-6t^2$, which contains a linear term. The presence of this linear term causes the derivative of the Noise function to be discontinuous at cubic cell boundaries.

The new method is a result of combining several different ideas together. When used in combination, the result is a far superior Noise function that satisfies all of the requirements outlined above:

1. Rather than using a table lookup scheme to compute the index of a pseudo-random gradient at each surrounding vertex, the new method uses a bit-manipulation scheme that uses only a very small number of hardware gates.
2. Rather than using a cubic interpolation grid, the new method uses a simplicial grid. This confers two advantages during reconstruction:
   1. Only four component evaluations need be done per Noise evaluation (one per contributing vertex), rather than the eight evaluations required in a cubic lattice, and
   2. The axis aligned visual impression of a grid structure is replaced by a far less visually noticeable simplicial packing structure.

Rather than using a tricubic interpolation function, this interpolation scheme uses a spherically symmetric kernel, multiplied by a linear gradient, at each component surrounding vertex. This confers three advantages:

1. The new method contains no directional artifacts due to interpolation function;
2. The new method contains no directional or discontinuity artifacts in gradient;
3. Using the new method, it is practicable to compute the derivative function directly.

Rather than using inner products, with their attendant (and expensive) multiplies, to convert each index into an actual pseudo-random gradient, the new reconstruction method uses a method that produces more visually uniform results, and is easier to integrate into a derivative calculation, while requiring no multiplies at all.

Each of these changes is now described in more detail:

The New Pseudo-random Generator Primitive
Computing Index of Pseudorandom Gradient Given an integer lattice point (i,j,k), the new method uses a bit-manipulation algorithm to generate a six bit quantity. This six bit quantity is then used to generate a gradient direction. The six bit quantity is defined as the lower six bits of the sum:

b(i,j,k,0)+b(j,k,i,1)+b(k,i,j,2)+b(i,j,k,3)+b(j,k,i,4)+b(k,i,j,5)+b(i,j,k,6)+b(j,k,i,7)

where b( ) uses its last argument as a bit index into a very small table of bitPatterns.

define b(i,j,k,B):

patternIndex=4*$bit_B(i)$+2*$bit_B(j)$+$bit_B(k)$ return bitPatterns[patternIndex]

and where the bit pattern table is defined as:

bitPatterns[ ]={0x15,0x38,0x32,0x2c,0x0d,0x13,0x07,0x2a}

Using Index to Derive Pseudorandom Gradient

The new method converts a six bit pseudo-random index into a visually uniform gradient vector which is easy to integrate into a derivative calculation and which requires no multiplies to compute. The key innovation is to use values of only zero or one for the gradient magnitude. This is a refinement of the technique first introduced in [Perlin, K., Patent Application, Hardware implementation of Perlin Noise, incorporated by reference herein] for computing the gradient without doing any multiplication operations.

The specific new technique is as follows: The six bit index is split into (i) a lower three bit quantity, which is used to compute a magnitude of either zero or one for each of x,y and z, and (ii) an upper three bit quantity, which is used to determine an octant for the resulting gradient (positive or negative sign in each of x,y, and z).

(i) Magnitude Computation, Based on the Three Lower Bits

If $bit_1 bit_0$=0, then let (p,q,r)=(x,y,z). Otherwise, let (p,q,r) be a rotation of the order of (x,y,z) to (y,z,x) or (z,x,y), as $bit_1 bit_0$=1 or 2, respectively, and set either q or r to zero as $bit_2$=0 or 1, respectively.

| $bit_2 bit_1 bit_0$ | | | | $bit_2 bit_1 bit_0$ | | | |
|---|---|---|---|---|---|---|---|
| 000 | p = x | q = y | r = z | 100 | p = x | q = y | r = z |
| 001 | p = y | q = z | r = 0 | 101 | p = y | q = 0 | r = x |
| 010 | p = z | q = x | r = 0 | 110 | p = z | q = 0 | r = y |
| 011 | p = x | q = y | r = 0 | 111 | p = x | q = 0 | r = z |

(ii) Octant Computation, Based on the Three Upper Bits

Once p,q,r have been determined, invert the sign of p if $bit_5$=$bit_3$, of q if $bit_5$=$bit_4$, and of r if $bit_5$=($bit_4$!=$bit_3$), then add together q, and r. The resulting possible gradient values are shown in the table below:

| $bit_5 bit_4 bit_3$ | | $bit_5 bit_4 bit_3$ | |
|---|---|---|---|
| 000 | −p − q + r | 100 | p + q − r |
| 001 | p − q − r | 101 | −p + q + r |
| 010 | −p + q − r | 110 | p − q + r |
| 011 | p + q + r | 111 | −p − q − r |

In this way, a gradient vector is defined using only a small number of bit operations and two additions. In particular, the computation of gradient requires no multiply operations. This contrasts with previous implementations of Perlin Noise, in which three multiply operations were required for each gradient computation (one multiply in each of the three component dimensions).

The New Reconstruction Primitive
Simplex Grid

Rather than placing each input point into a cubic grid, based on the interger parts of its (x,y,z) coordinate values, the input point is placed onto a simplicial grid as follows:

1. Skew the input point (x,y,z) to:
   define skew((x,y,z)−>(x',y',z')):

$s=(x+y+z)/3$ $(x',y',z')=(x+s,y+s,z+s)$

This skew transformation linearly scales about the origin, along the x=y=z axis, bringing the point (1,1,1) to the point (2,2,2).

2. Use the integer coordinates in the skewed space to determine a surrounding unit cube whose corner vertex with lowest coordinate values is:

$$(i',j',k')=(\text{floor}(x'),\text{floor}(y'),\text{floor}(z'))$$

This corner point can be converted back to the original unskewed coordinate system via:

define unskew((i',j',k')->(i,j,k)):

$$s'=(i'+j'+k')/6 (i,j,k)=(i-s',j-s',k-s')$$

Also consider the original coordinates relative to the unskewed image of the cube corner:

$$(u,v,w)=(x-i,\ y-j,\ z-k)$$

3. Find the simplex containing the point. Relative to (i,j,k), the skewed image of relative point (u,v,w) will lie in one of the six simplices:

{(0,0,0), (1,0,0), (1,1,0), (1,1,1)}
{(0,0,0), (1,0,0), (1,0,1), (1,1,1)}
{(0,0,0), (0,1,0), (1,1,0), (1,1,1)}
{(0,0,0), (0,1,0), (0,1,1), (1,1,1)}
{(0,0,0), (0,0,1), (1,0,1), (1,1,1)}
{(0,0,0), (0,0,1), (0,1,1), (1,1,1)}

Each of these simplices can be defined as an ordered traversal A,B,C from vertex (0,0,0) to vertex (1,1,1) of a unit cube in the skewed space, where {A,B,C} is some permutation of {(1,0,0), (0,1,0), (0,0,1)}. For example, the last simplex above can be defined as an z,y,x traversal, since its first transition A=(0,0,1), its second transition B=(0,1,0), and its third transition C=(0,0,1).

Which simplex contains the input point is determined by the relative magnitudes of u, v and w. For example, if w>v and v>u, then the first transition will be in the z dimension, so A=(0,0,1), and the second transition will be in the y dimension, so B=(0,1,0). In this case, the point lies within the simplex whose traversal order is z,y,x.

The four surrounding vertices of the simplex can now be defined as:

{(i,j,k), (i,j,k)+unskew(A), (i,j,k)+unskew(A+B), (i,j,k)+unskew(A+B+C)}

Spherical Kernel

If the input point is positioned (u,v,w) from a given simplex vertex, then the contribution from that vertex to the final result will be given by:

$$t=0.6-(u^2+v^2+w^2)$$

if t>0 then 8 ($t^4$) else 0

Hardware Integration

The new method can be implemented as a set of pipelined hardware logic gates, in a way that would be very straightforward to one skilled in the art, given the reference implementation below.

Any implementation needs to choose the number of bits of accuracy desired for both input and for output. This choice of bit-depth will vary the number of hardware gates required, does not in any significant way modify the enabling techniques disclosed herein.

In a pipelined implementation, it is very straightforward to maintain a high performance relative to the number of hardware gates used in the implementation, by pipelining the input. This guarantees that the circuitry which implements each different part of the method is always in active use.

Using the same approach as was described in the disclosure of [Perlin, K., Patent Application, Hardware implementation of Perlin Noise, incorporated by reference herein], the hardware circuitry that implements the new method can make use of an efficiently pipelined parallel implementation, as follows:

1. A supervisory process fills a memory array with a sequence of (x,y,z) tuples to be evaluated;
2. The disclosed method is invoked by pipelining these input values into a section of logic circuitry that implements the method;
3. The resulting sequence, of Noise derivative/value tuples ($f_x$, $f_y$, $f_z$,f) is placed into an output memory array;
4. The supervisory process reads out this array of results, and moves on to the next operation within the algorithmic sequence of texture synthesis.

It is straightforward to generalize this approach to higher dimensions. In n dimensions, a hypercube can be decomposed into n! simplices, where each simplex corresponds to an ordering of the edge traversal of the hypercube from its lower vertex (0,0, . . . 0) to its upper vertex (1,1, . . . 1). For example, when n=4, there are 24 such traversal orderings. To determine which simplex surrounds the input point, one must sort the coordinates in the difference vector ($u_1$, . . . $u_n$) from the lower vertex of the surrounding skewed hypercube to the input point.

For a given n, the "skew factor" f should be set to $f=(n+1)^{1/2}$, so that the point (1,1, . . . 1) is transformed to the point (f,f, . . . f). In addition, the exact radius and amplitude of the hypersphere-shaped kernel centered at each simplex vertex need to be tuned so as to produce the best visual results for each choice of n.

Previous implementations of Perlin Noise, since they were defined on a cubic grid, required a successive doubling of the number of grid points that need to be visited, for each increment in the number of dimensions n. The computational complexity, in terms of vector operations, required to evaluate Perlin noise in n dimensions was therefore $O(2^n)$. Since this is exponential in the number of dimensions, it is not practical beyond a few dimensions. In contrast, the new implementation since it is defined on a simplicial grid, requires only an increment in the number of grid points that need to be visited, for each increment in the number of dimensions n. The computational complexity, in terms of vector operations, required to evaluate the new implementation of Perlin noise in n dimensions is therefore O(n). Since this is only polynomial in the number of dimensions, it is practical even for higher dimensions.

To compute the computational complexity in terms of arithmetic operations, both of the above figures need to be multiplied by O(n), since the length of each contributing vector operation, and therefore the computational cost of each vector operation, is n, increasing linearly with the number of dimensions. Therefore, the computational complexity of previous Perlin Noise implementations in n dimensions is $O(n\ 2^n)$, whereas the computational complexity of the new Perlin Noise implementation in n dimensions is $O(n^2)$.

The important conclusion to be drawn from this analysis is that this new implementation of Perlin Noise, in contrast to previous implementations, is practical in even high dimensional spaces, because it is a computation of only polynomial complexity, not of exponential complexity. For example, the cost of computing Perlin Noise in 10 dimensions using previous implementations is approximately $O(10*2^{10})=O(10240)$, whereas the cost using the new implementation is approximately O(10*10)=O(100). In this case, a computational advantage factor of 100 is demonstrated.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

APPENDIX

A complete implementation of a function returning a value that conforms to the new method is given below as a Java class 6/34 definition:

```
public final class Noise3 {
    static int i,j,k, A[ ] = {0,0,0};
    static double u,v,w;
    static double noise (double x, double y, double z) {
        double s = (x+y+z)/3;
        i=(int)Math.floor(x+s); j=(int)Math.floor(y+s); k=(int)Math.floor(z+s);
        s = (i+j+k)/6.; u = x-i+s; v = y-j+s; w = z-k+s;
        A[0]=A[1]=A[2]=0;
        int hi = u>=w ? u>=v ? 0 : 1 : v>=w ? 1 : 2;
        int lo = u< w ? u< v ? 0 : 1 : v< w ? 1 : 2;
        return K(hi) + K(3-hi-lo) + K(lo) - K(0);
    }
    static double K(int a) {
        double s = (A[0]+A[1]+A[2])/6.;
        double x = u-A[0]+s, y = v-A[1]+s, z = w-A[2]+s, t = .6-x*x-y*y-z*z;
        int h = shuffle(i+A[0],j+A[1],k+A[2]);
        A[a]++;
        if (t < 0)
            return 0;
        int b5 = h>>5 & 1, b4 = h>>4 & 1, b3 = h>>3 & 1, b2 = h>>2 & 1, b = h & 3;
        double p = b= =1?x:b= =2?y:z, q = b= =1?y:b= =2?z:x, r = b= =1?z:b= =2?x:y;
        p = (b5= =b3 ? -p : p); q = (b5= =b4 ? -q : q); r = (b5!=(b4^b3) ? -r : r);
        t *= t
        return 8 * t * t * (p + (b= =0 ? q+r : b2= =0 ? q : r));
    }
    static int shuffle(int i, int j, int k) {
        return b(i,j,k,0) + b(j,k,i,1) + b(k,i,j,2) + b(i,j,k,3) +
               b(j,k,i,4) + b(k,i,j,5) + b(i,j,k,6) + b(j,k,i,7) ;
    }
    static int b(int i, int j, int k, int B) { return T[b(i,B)<<2 | b(j,B)<<1 |
        b(k,B)]; }
    static int b(int N, int B) { return N>>B & 1; }
    static int TN[] = {0x15,0x38,0x32,0x2c,0x0d,0x13,0x07,0x2a};
}
```

What is claimed is:

1. A method for generating images comprising the steps of:
   introducing information into a computer from which the images are produced;
   producing the images with texture that do not have visible grid artifacts with the computer using a bit-manipulation to generate a six bit quantity from an integer lattice point i,j,k, where the six bit quantity is defined as a lower six bits of a sum:

b(i,j,k,0)+b(j,k,i,1)+b(k,i,j,2)+b(i,j,k3)+b(j,k,i,4)+b(k,i,j,5)+b(i,j,k,6)+b(j,k,i,7)

define b(i,j,k,B);

patternIndex=4*bit$_B$(i)+2*bit$_B$(j)+bit$_B$(k) return bitPatterns[patternIndex]

where B is 0 or a positive integer;
   generating a gradient direction using the six bit quantity; and
   displaying the images on a display.

2. A method for generating images comprising the steps of:
   introducing information into a computer from which the images are produced;
   producing the images with texture that do not have visible grid artifacts with the computer by placing an input point x,y,z onto a simplicial grid; where x, y and z are integers;
   skewing the input point to:

define skew((x,y,z)->(x',y',z')): s=(x+y+z)/3 (x',y',z')=(x+s,y+s,z+s); and displaying the images on a display.

3. A method as described in claim 2 including the step of using the skewed input point to determine a surrounding unit cube whose corner vertex with lowest coordinate values is:

(i',j',k')=(floor(x'),floor(y'),floor(z')).

4. A method as described in claim 3 wherein the producing step includes the step of evaluating each vertex of all 4 vertices of the grid.

5. A method for generating images comprising the steps of:
   producing the images with texture that do not have visible grid artifacts with the computer by decomposing a hypercube into n! simplices, where each simplex corresponds to
   an ordering of an edge traversal of the hypercube from its lowest vertex (0,0, . . . , 0) to its upper vertex (1,1 . . . , 1), where n is greater than or equal to 3 and is an integer; and
   displaying the images on a display.

6. A method as described in claim 5 wherein the producing step has a computational complexity on the order of $n^2$.

* * * * *